(12) United States Patent
Socher et al.

(10) Patent No.: US 6,446,040 B1
(45) Date of Patent: *Sep. 3, 2002

(54) INTELLIGENT TEXT-TO-SPEECH SYNTHESIS

(75) Inventors: Gudrun Socher, Mountain View; Mohan Vishwanath, San Jose; Anurag Mendhekar, Sunnyvale, all of CA (US)

(73) Assignee: Yahoo! Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/098,669

(22) Filed: Jun. 17, 1998

(51) Int. Cl.$^7$ .............................................. G01L 13/08
(52) U.S. Cl. ...................................................... 704/260
(58) Field of Search ......................................... 704/260

(56) References Cited

U.S. PATENT DOCUMENTS

| | | | |
|---|---|---|---|
| 5,029,214 A | | 7/1991 | Hollander ................... 704/272 |
| 5,561,736 A | * | 10/1996 | Moore et al. ............... 704/260 |
| 5,572,625 A | * | 11/1996 | Raman et al. .............. 704/260 |
| 5,652,828 A | * | 7/1997 | Silverman ................... 704/260 |
| 5,761,640 A | | 6/1998 | Kalyanswamy et al. .... 704/260 |
| 5,850,629 A | * | 12/1998 | Holm et al. ................. 704/260 |
| 5,860,604 A | * | 1/1999 | Henton ....................... 704/260 |
| 5,950,163 A | * | 9/1999 | Matsumoto ................. 704/260 |
| 6,081,780 A | * | 6/2000 | Lumelsky .................... 704/260 |
| 6,098,041 A | * | 8/2000 | Matsumoto ................. 704/260 |
| 6,226,614 B1 | * | 5/2001 | Mizuno et al. ............. 704/260 |
| 6,246,672 B1 | * | 6/2001 | Lumeslkky ................. 370/310 |

FOREIGN PATENT DOCUMENTS

| | | | |
|---|---|---|---|
| EP | 0 841 625 A1 | 11/1997 | ............ G06F/17/28 |
| WO | WO 96/22594 | 7/1996 | ............. G01L/5/06 |

OTHER PUBLICATIONS

Gerard K. Rambally and John R. Stelly, II, "A Text–to–Speech Environment: Applications in Education," Proc. IEEE Southeastcon 91, vol. 2, p. 1158–1161, Apr. 1991.*

Database WPI, Week 199620, Derwent Publications Ltd., London, GB; AN 1996–192669, XP002118067 & JP 08 063188 A, Mar. 8, 1996 abstract.

* cited by examiner

Primary Examiner—Tālivaldis Ivars Šmits
(74) Attorney, Agent, or Firm—Fliesler Dubb Meyer & Lovejoy LLP (57) ABSTRACT

A method and an apparatus of synthesizing speech from a piece of input text 104. In one embodiment, the method includes the steps of retrieving the input text 104 entered into a computing system, and transforming the input text 104 based on the semantics 152 of at least one word of the input text 104 to generate a formatted text 108 for speech synthesis. The transforming includes adding an audio rendering effect tot he input text based on the semantics of at least one work, the audio rendering effect comprising background music, special effect sounds, and context-sensitive sounds. In another embodiment, the transformation also depends on at least one characteristic of the person listening to the speech output 118. In yet another embodiment, the transformation further depends on at least one characteristic of the hardware employed by the user to listen to the speech output 118. The transformed text can be further modified to fit a text-to-speech engine to generate the speech output 118.

29 Claims, 4 Drawing Sheets

INTELLIGENT TEXT-TO-SPEECH SYNTHESIS

BACKGROUND OF THE INVENTION

The present invention relates generally to text-to-speech synthesis and more particularly to intelligent text-to-speech synthesis.

We receive a lot of information through hearing, especially when our visual attention is needed for other tasks, such as driving. Radio is a good source of audible documents, and some of us become quite dependent on it. Based on one study, on average, every family in the United States has five radios. Though radio might have become indispensable, the programs put forward by radio stations might not necessarily be what we are currently interested in.

Read-out documents or audio-documents, for example, novels, are available on the market. However, such tapes seem to be only available for a specific market sector. For example, there does not seem to be audio-documents for information with a short lifetime, such as news, weather forecasts or results of sport events. Some information, e.g. stock quotes, is only valuable for a very short period of time, and it would make no sense to produce such audio-documents.

A large number of audio-documents can be produced by automatically translating text into speech output. General discussions of such text-to-speech synthesis systems can be found, for example, in the following publications:

1. Multilingual Text-to-Speech Synthesis, The Bell Labs Approach, written by Richard Sproat, and published by Kluwer Academic Publishers, in 1998.
2. IBM ViaVoice.

Such systems typically perform direct word to sound transformation. The speech output is usually not very natural, and they tend to make mistakes. This might be because such systems are not "aware" of what they are reading.

The way we read takes into account what we are reading. For example, if we are reading the topic sentence of a news report, typically, we put in some emphasis. But, since existing systems do not seem to have any clue as to the meaning of the text they are transforming, they tend to transform input texts in the same speed, tone and volume. That is one of the reasons why the speech outputs of existing systems are typically monotonic and boring.

The way we read also should take into account our listener. If our listener is visually impaired and we are describing an object, we should include more details in the object. Moreover, the way we speak should also consider the hardware a listener employs to hear. For example, if your message is heard in a noisy room, probably, you should speak louder.

It should be apparent from the foregoing that there is still a need for an intelligent text-to-speech synthesizer that is, for example, sensitive to the content of the text, sensitive to the one hearing the text or adapts to the hardware the listener employs to hear the text.

SUMMARY OF THE INVENTION

The present invention provides methods and apparatus to synthesize speech from text intelligently. Different important, but previously ignored, factors in the present invention improve on the speech generated. The invented speech synthesizer can take into account the semantics of the input text. For example, if it is a man who should be speaking, a male voice will be used. The synthesizer can take into account the user profile of the person hearing the input text. The synthesizer can also be sensitive to the hardware the user employs to listen to the input text. Thus, the text-to-speech synthesizer is much more intelligent than those in the market.

There are a number of ways to implement the invention. In one embodiment, the synthesizer includes a transformer, a modifier, a text-to-speech software engine and a speech hardware. The transformer analyzes the input text and transforms it into a formatted text. The modifier then modifies this formatted text to fit the requirements of the text-to-speech software engine, whose outputs are fed to the speech hardware to generate the output speech.

The input text has a number of characteristics. It belongs to a class that has at least one specific pattern. For example, the pattern may be that the most important paragraphs of some type of articles are the first one and the last one, as in a newspaper.

The formatted text also has a number of characteristics. It can be independent of the text-to-speech software engine; for example, it is written in Extensible Markup Language (XML).

In one embodiment, the generation of the formatted text is based on the semantics of at least one word of the text. The semantics can be determined by an author—a human being. In another approach, the semantics is generated through mapping the words to a database. For example, if the word is the name of a company, then the database can bring in additional information about the company, such as its stock price at a specific time. In another approach, the semantics is generated through an inference machine. For example, if the words are "Mr. Clinton," the inference machine, based on some pre-stored rules, will assume that the words refer to a male person. Then, a male voice might be used for that purpose.

In another embodiment, the transformation to generate the formatted text is based on at least one characteristic of the user listening to the synthesized speech. In yet another embodiment, the transformation to generate the formatted text depends on at least one characteristic of the hardware the user employs to listen to the synthesized speech. The above embodiments can be mixed and matched. For example, the transformation can be based on semantics of at least one word of the text and one characteristic of the user listening to the synthesized speech.

Based on the above approaches, a number of characteristics of the speech output can be determined. This can include the volume, the pitch, the gender of the voice, the tone, the wait period between one word from the next, and other special emphasis on a word. This special emphasis can be some type of sound that is based on the semantic, but not the syntactic meaning of the word. Examples of the sound made can be a deep sigh, a grunt or a gasp. These sound-based expressions can convey a lot of meaning. Just as a picture is worth a thousand words, appropriate sound or emphasis provides additional meaning that can be very fruitful in any communication process.

The formatted text can be further modified to fit the requirements of the text-to-speech software engine. In one embodiment, the modification is through tagging, where a tag can be a command interpreted by the engine, and is not a word pronounced by the engine. The modified text is then fed to the speech hardware, which generates the speech output.

Note that the language used in the specification has been principally selected for readability and instructional purposes, and may not have been selected to delineate or circumscribe the inventive subject matter. Also, the features and advantages described in the specification are not all-inclusive. Other aspects and advantages of the present invention will become apparent to one of ordinary skill in the art, in view of the specification, which illustrates by way of example the principles of the invention.

BRIEF DESCRIPTION OF THE DRAWINGS

Same numerals in FIGS. 1–4 are assigned to similar elements in all of the figures. Embodiments of the invention are discussed below with reference to FIGS. 1–4. However, those skilled in the art will readily appreciate that the detailed description given herein with resect to these figures is for explanatory purposes as the invention extends beyond these limited embodiments.

DETAILED DESCRIPTION OF THE INVENTION

Figure 1:
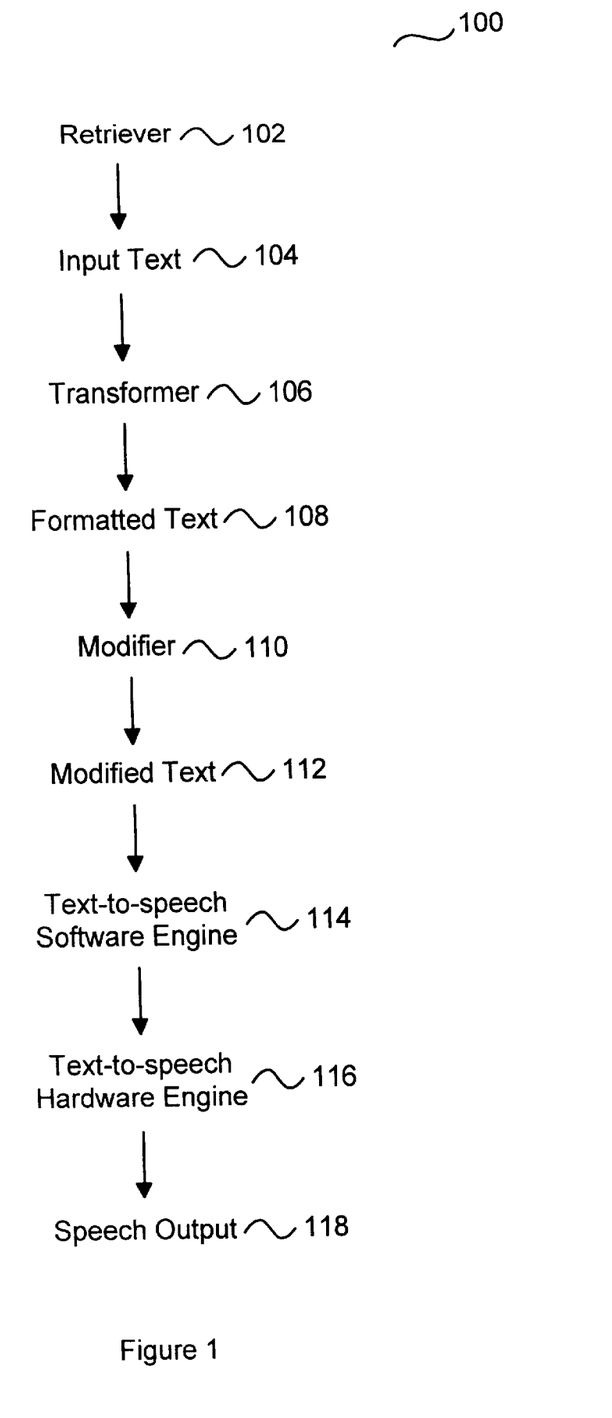
FIG. 1 shows one embodiment to implement the present invention.

FIG. 1 shows one embodiment 100 to implement the present invention in a computing system. First a retriever 102 retrieves a piece of input text 104 previously entered into the system. The input text 104 can be in a storage medium. Then, a transformer 106 analyzes the input text 104 and transforms it into a formatted text 108. A modifier 110 further modifies this formatted text 108 to fit the requirements of a text-to-speech software engine 114 and a hardware engine 116 to generate the speech output 118.

The input text 104 belongs to a class that has at least one specific characteristic. For example, for some articles, the most important paragraphs are the first one and the last one, as in a newspaper. Another example is a weather report, as shown in the following example 1.

The formatted text 108 also has a number of characteristics. It can be independent of the text-to-speech software engine 114. In other words, the formatted text 108 can be written in a language that can be executed transparently in a number of different platforms. Then, the formatted text 108 can be further modified by the modifier 110 to fit the text-to-speech software engine 114.

In one embodiment, the formatted text 108 is written in Extensible Markup Language (XML), which is a data format for structured document interchange on the World Wide Web. XML is a standard method of document markup. One can define the grammar to mark-up this document in terms of tags and their attributes. A general description on XML can be found through the Web, with a URL of http://www.w3.org/XML, in an article entitled "Extensible Markup Language (XML)."

In another embodiment, the formatted text 108 includes tags, which define specific actions and can be implemented by subsequent engines that interpret those tags. Based on the XML example, an XML enabled browser can interpret the XML tags and carry out the appropriate actions as specified by the tags. The actions can include different audio rendering effects, such as background music, special effect sounds, and context sensitive sounds. For example, if the input text 104 is on waltz from Vienna, then Johann Strauss' Vienna Waltz might be broadcasted as background music while the text is read.

Other markup languages are also applicable to the present invention, such as:

(I) Standard Generalized Markup Language (SGML), as disclosed, for example, in *The SGML Handbook,* written by Charles Goldfarb, published in Clarendon Press, Oxford, in 1990.

(II) Spoken Text Markup Language (STML), as disclosed, for example, in *SSML: A Speech Synthesis Markup Language,* written by Paul Taylor and Amy Isard, published in Speech Communication 21, in 1996.

(III) A Markup Language for Text-to-Speech Synthesis, written by Richard Sproat, Paul Taylor, Michael Tanenblatt, and Amy Isard, published in the Proceedings of the 5th European Conference on Speech Communication and Technology, Rhodes, in 1997.

Figure 2:
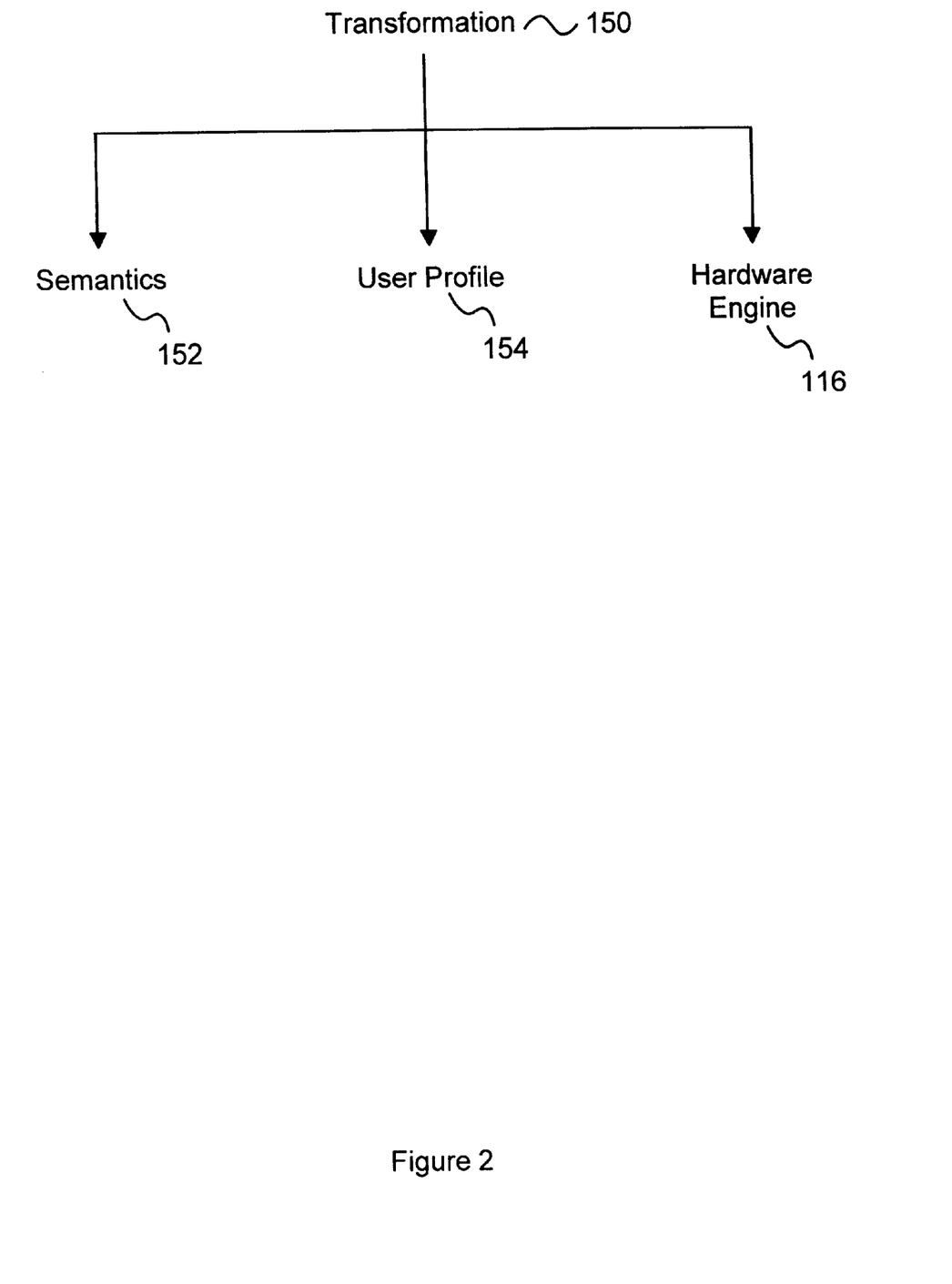
FIG. 2 shows three approaches to transform a piece of input text into formatted text in the present invention.

FIG. 2 shows three approaches to transform a piece of input text 104 into formatted text 108. In one approach, the semantics 152 of the input text 104 is taken into account. One of the reasons why synthesized speech typically lacks the richness of a human voice is that the synthesizer does not understand the context of what it is reading. It is not source sensitive. In other words, it is not sensitive to the source. Imagine if you are reading about someone crying, probably your voice would be different from your reading of someone laughing. A synthesizer reading both passages the same way would convey a wrong message. In another approach, the person hearing the speech output 118 is taken into account. One way to achieve this is by knowing the user profile 154 of that person. In yet a third approach, the hardware the user employs to listen to the speech output 118 is taken into account.

Figure 3:
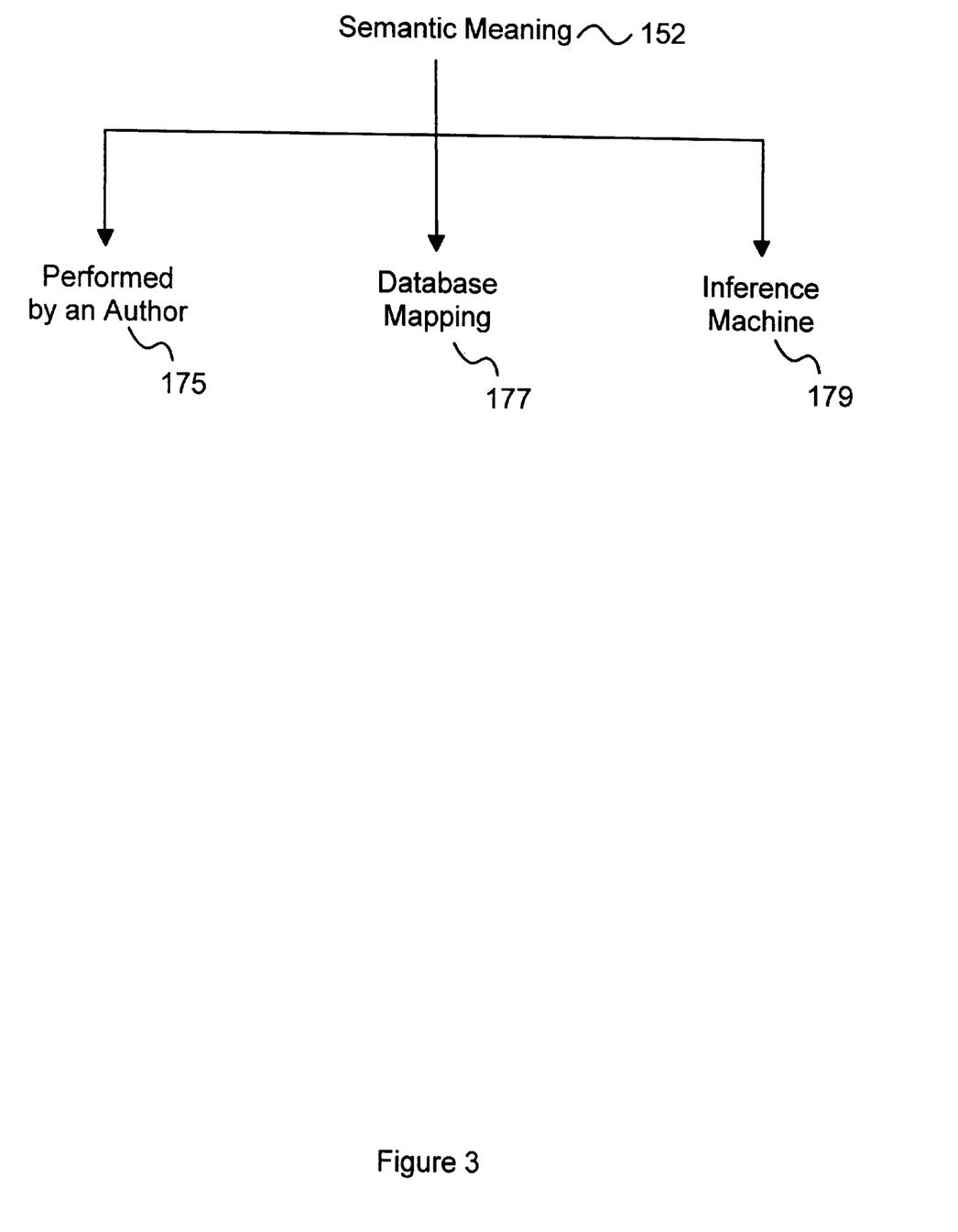
FIG. 3 shows three approaches to transform a piece of input text based on the semantics of at least one word in the present invention.

FIG. 3 shows tree approaches to transform a piece of input text 104 based on the semantics 152 of at least one word in the text. In one approach, a person 175 determines the semantics 152. For example, the person, at strategic locations in the text, enters his inputs indicating how he prefers different words to be read. If he wants to read louder the sentence, "She loves me!", he would put an appropriate command character in the formatted text 108 at the end of the sentence. He transforms the input text 104 according to his preference.

In another approach, the transformation is done automatically by the transformer 106. It is through mapping some of the key words to a database 177. In one embodiment, the text is first parsed to identify specific words in the text, such as the proper nouns. These words are mapped to a pre-built database 177 to extract additional information. For example, if the proper noun is Microsoft, the word may be mapped to a database 177 describing different information on Microsoft, such as its current stock price.

In yet another embodiment, understanding the semantics is performed through an inference machine 179. Based on information in the text, the inference machine 179 determines the appropriate actions. For example, the inference machine 179 can perform natural language parsing, and statistical or rule-based parsing/understanding of the text. The rules can be created by experts in the field. The statistical approach can acquire information from training samples. Through such parsing/understanding techniques, words are interpreted to determine subsequent actions. It should be obvious to those skilled in the art ways to perform natural language parsing, and statistical or rule-based parsing/understanding. Such techniques will not be further described in the present invention.

Figure 4:
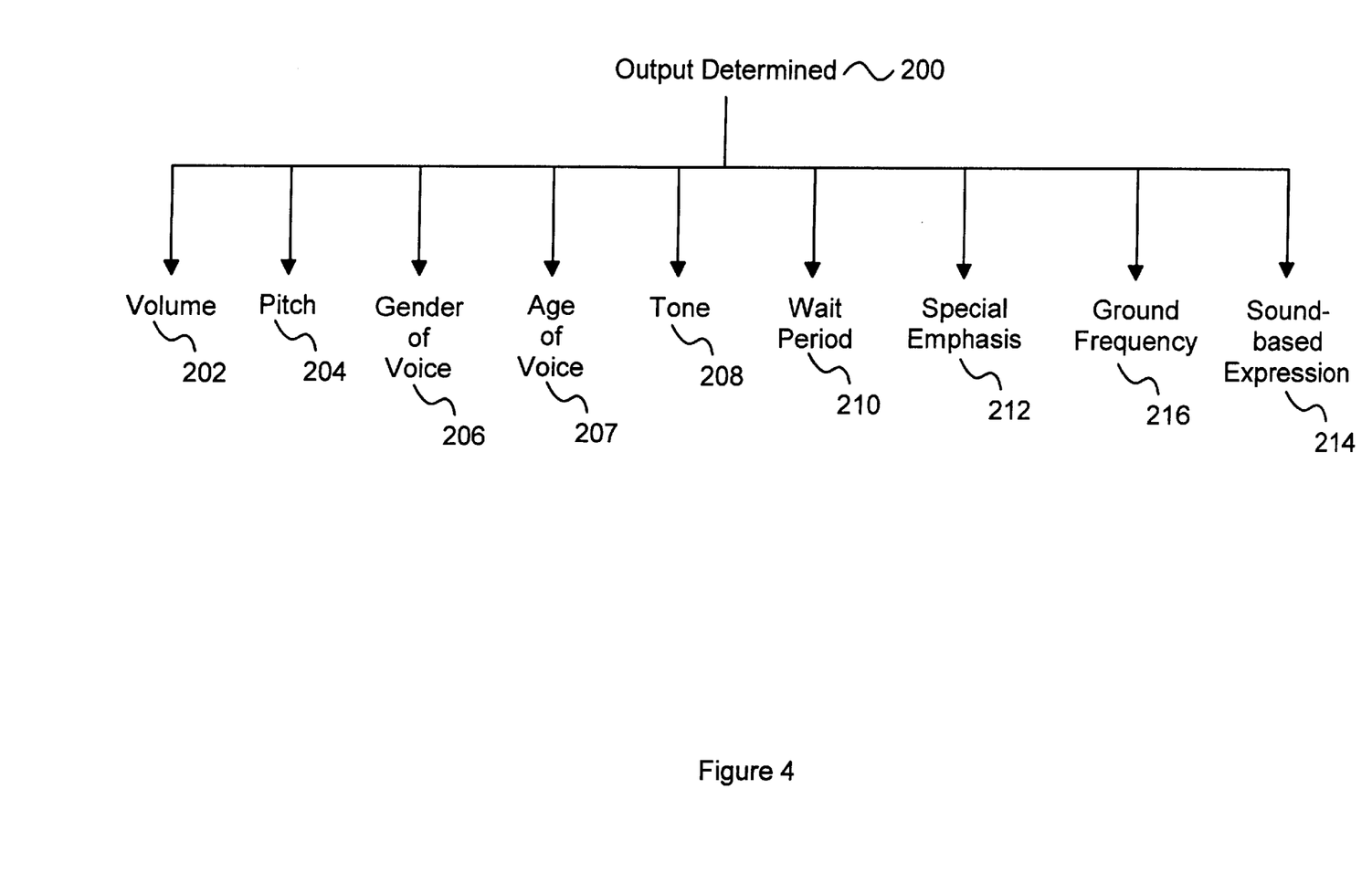
FIG. 4 shows a number of characteristics of the speech output that can be determined in the present invention.

FIG. 4 shows a number of characteristics of the speech output 118 that can be determined in the present invention. Such determination is entered into the input text 104 to generate the formatted text 108. In one embodiment, the characteristics can be classified as prosodic characteristics, and include the volume 202, the pitch 204, and the tone 208. Other characteristics of the voice of the speech output 118 include the gender of the voice 206, and the perceived age 207 of the voice. The wait period 210 between one word from the next can also be modified. For example, after the phrase, "complete silence," nothing will be generated by the synthesizer for one second.

Another characteristic includes special emphasis 212 placed on a word. A special emphasis can be some type of sound that is based on the semantics of the word. Examples of such type of sound include a deep sigh, a grunt or a gasp. These sound-based expressions 214 can convey a lot of information. For example, a sigh after the sentence, "he smokes a cigarette," can illustrate relaxation.

Another output that can be determined is the ground frequency 216 of the speech output 118. It is the fundamental frequency contour of a piece of text when it is read out, and is typically not a constant value over an entire piece of text. However, as shown, for example, by the spectrogram of a segment of speech, one can estimate its principal frequency component through statistical analysis. Such analysis should be obvious to those skilled in the art, and will not be further described.

The formatted text 108 is further modified to fit the requirements of a text-to-speech software engine 114. In one embodiment, the modification is through tagging. Here a tag can be a command tailored for the engine, and is not a word pronounced by the engine. The modified text 112 is then fed to the speech software and hardware to generate the speech output 118.

In another embodiment, the transformation to generate the formatted text 108 is based on one characteristic of the user listening to the speech output 118. This can be accomplished based on the user profile 154. For example, if the user is the chief executive of a company, probably she does not have that much time. Then only essential information will be communicated. If she is interested to find out todays temperature of San Jose, then instead of stating to her both the high, the low and the average temperature, the synthesizer only presents to her the average temperature—"The temperature of San Jose is 63 degrees." In another example, the user is hearing impaired, and the volume of the speech output 118 should be louder.

In yet another embodiment, the transformation to generate the formatted text 108 depends on the hardware engine 116, or the speech hardware, the user employs to listen to the speech output 118. For example, if the output is received by someone through a phone in a noisy room, probably, the volume of the speech output 118 should be louder. In this example, the phone with the room can be considered as the hardware engine 116.

In the above embodiments that are based on semantics 152, user profile 154 and hardware engine 116, the embodiments can be mixed and matched. For example, the transformation can be based on the semantics 152 of at least one word of the text and the profile of the user listening to the speech output 118.

The above embodiments describe the transformer 106 and the modifier 110. In one embodiment, the input text 104 is changed only by the transformer 106, with the formatted text 108 tailored to one text-to-speech software and hardware engine 116. In yet another embodiment, the formatted text 108 is tailored to one specific text-to-speech hardware engine 116 without the need of a text-to-speech software engine. In a further embodiment, there is a text-to-speech engine coupled to the transformer 106 to generate the speech output 118.

EXAMPLES

The following two examples are taken from web pages from Mar. 11, 1998. The original and the XML-formatted text are shown. The relevant information is extracted from the web pages using custom-built parsers and transducers. The final tagged text-to-speech input is generated using the syntax proposed by the Microsoft Speech SDK. p The first example is a weather forecast. The second example is a news story.

1. Weather Forecast
   Source: (textual information extracted from html page
   http://weather.yahoo.com/forecast/-San_Jose_CA_US_f.html)

| Yahoo! Weather - San Jose F° or C° Weather: United States: California: San Jose | | | | | |
|---|---|---|---|---|---|
| Today | | Thu | Fri | Sat | Sun |
| 63° at 12:45 pm EST <101020 30405060 708090100+ | [Image] Mostly Cloudy | Hi 74 Lo 45 | [Image] Partly Cloudy Hi 68 Lo 48 | [Image] Showers Hi 60 Lo 56 | [Image] Partly Cloudy Hi 64 Lo 50 | [Image] Partly Cloudy Hi 66 Lo 53 |

XML formatted:
   <!DOCTYPE forecast http://weather.yahoo.com/ . . .
   <weather>
   <region United States />
   <state California />
   <city San Jose />
   <tempscale F />
   <today temp="63 at 12:45pm EST" type="Mostly Cloudy", Hi=74, Lo=45/>
   <extendedForecast>
      <Thu type="Partly Cloudy", Hi=74, Lo=45/>
      <Fri type="Showers", Hi=60, Lo=56/>
      <Sat type="Partly Cloudy", Hi=64, Lo=50/>
      <Sun type="Partly Cloudy", Hi=66, Lo=53/>
   </extendedForecast>
   </weather>
   </forecast>

Tagged TTS Input:
Weather forecast for San Jose, \pau=100\ California . \pau=500\ Today it is Mostly Cloudy \wav=mcloudy.wav\. The temperatures range between 74 and 45 degrees \Prn=Farenheit=farenhight\. \pau=500\ Tomorrow it will be Partly Cloudy \wav=pcloudy.wav\, with temperatures between 68 and 48 degrees \Prn=Farenheit=farenhight\.

We added the custom tag \wav\ to the set of tags of the Microsoft Speech SDK. \wav\ indicates that a sound file should be mixed in wherever this tag appears. The transformation rules from XML to the tagged data explicitly leave out information here. The current temperature and the extended forecast information are not spoken in this example.

2. News

Source: (extract from http://dailynews.yahoo.com/headlines/top_stories/story.html?s=n/-reuters/980311/news/stories/weather_13.html)

<table> <tr> <td>
<title> Many Without Power in Midwest; South Colder</title>
<hr>
<strong>
<!—Yahoo TimeStamp: 889598580—>
Wednesday March 11 1:43 AM EST
</strong>
<h2> Many Without Power in Midwest; South Colder</h2>
<!—Yahoo TimeStamp: 889598580—>
<p>
   By Andrew Stern
<p>
   CHICAGO (Reuters)—Temperatures plunged Tuesday in the wake of a late winter storm that knocked out power to hundreds of thousands of people across the Midwest and triggered flooding in the Southeast.
<p>
   &quot;Several counties have declared snow emergencies, meaning people should stay off the roads,&quot; Indiana Emergency Management spokesman Alden Taylor said. &quot;There are so many cars stranded on the roads, it's hard for plows to get through.&quot;
<p>
   . . .

XML formatted:

<!DOCTYPE news http://dailynews.yahoo.com/headlines . . .
<http://dailynews.yahoo.com/headlines? . . . >>
<head1> Many Without Power in Midwest; South Colder </head1>
   <author> By Andrew Stern </author>
   <place> Chicago </place> <agency> (Reuters) </agency>—
   <main> Temperatures <stress> plunged </stress> Tuesday in the wake of a late winter storm that knocked out power to <stress> hundreds of thousands of people </stress> across the Midwest <subclause> and triggered flooding in the Southeast </subclause>.
   <quote male Alden-Taylor> Several counties have declared snow emergencies, <subclause> meaning people should stay off the roads </subclause>, </quote> <subclause> Indiana Emergency Management spokesman Alden Taylor said </subclause>.
   <quote male Alden-Taylor> There are so many cars stranded on the roads, <2ndclause> it's hard for plows to get through </2ndclause>. </quote>
   </main>
</news>

Used formatting rules: (a) mark all standard elements of an article such as headline, author, etc. (b) identify the syntactic structure of the text (e.g. subclauses), (c) find quotes, (d) find verbs which stress events, and (e) mark phrases that emphasize exceptional properties of events.

Tagged TTS Input:

\wav=ping.wav\\Vce=Language=English,Gender=male,Sytle=Business\Many Without Power in Midwest; South Colder \pau=1000\

\wav=dong.wav\Chicago \pau=500\—

\Vce=Language=English,Gender=female,Sytle=Business\

Temperatures \emp\plunged Tuesday in the wake of a late winter storm, \pau=100\ that knocked out power to \emp\hundreds-of-thousands-of-people across the Midwest, and triggered flooding in the Southeast.

Vce=Language=English,Accent=Midwest,Gender=male,Age=40\

\quot\ Several counties have declared snow emergencies, \pau=100\ meaning people should stay off the roads, \quot\ \Rst\ Indiana Emergency Management spokesman Alden Taylor said.

Vce=Language=English,Accent=Midwest,Gender=male,Age=40\

\quot\ There are so many cars stranded on the roads, it's hard for plows to get through.\quot\

\Rst\

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A method of synthesizing speech from input text, the method comprising:

retrieving the input text entered into a computing system;

transforming the input text based on the semantics of at least one word of the input text to generate a formatted text for speech synthesis, wherein the transforming step is automatic and depends upon the context of the input text, and wherein the step of transforming includes adding an audio rendering effect to the input text based on the semantics of at least one word, the audio rendering effect comprising background music, special effect sounds, and context sensitive sounds; and modifying the formatted text to fit the requirements of a text-to-speech software engine.

2. The method of claim 1, wherein an output of the text-to-speech software engine is fed to a hardware engine, the hardware engine synthesizing speech.

3. The method of claim 1, wherein the database mapping technique comprises mapping at least one word of the input text to one or more entries in a database.

4. The method of claim 1, wherein the inference machine infers an action based on at least one word of the input text.

5. The method of claim 1, wherein the formatted text is independent of the text-to-speech software engine.

6. The method of claim 1, wherein the input text belongs to a class that has at least one specific pattern.

7. The method of claim 1, wherein the formatted text is written in XML.

8. The method of claim 1, wherein the volume of at least one word of the input text, when synthesized, is determined in view of the semantics.

9. The method of claim 1, wherein the pitch of at least one word of the input text. when synthesized, is determined in view of the semantics.

10. The method of claim 1, wherein the gender of a synthesized voice pronouncing at least one word of the input text is determined in view of the semantics.

11. The method of claim 1, wherein the perceived age of a synthesized voice pronouncing at least one word of the input text is determined in view of the semantics.

12. The method of claim 1, wherein prosodic characteristics of a synthesized voice pronouncing at least one word of the input text is determined in view of the semantics.

13. The method of claim 12, wherein prosodic characteristics comprise volume, pitch, and tone.

14. The method of claim 1, wherein a period of silence exists between the recitation of at least one word of the input text and a subsequent word, a length of the period of silence being determined by the semantics.

15. The method of claim 1, wherein a synthesized voice pronounces at least one word of the input text with a special emphasis, the special emphasis comprising a sound based on the semantics.

16. The method of claim 1, wherein a synthesized voice pronounces at least one word of the input text at a around frequency determined in view of the semantics.

17. The method of claim 1, wherein the inference machine can parse the input text using natural language parsing and statistical parsing techniques.

18. The method of claim 1, wherein the step of modifying includes the step of marking the formatted text with a tag, a tag being a command tailored for the text-to-speech software engine.

19. The method of claim 1, wherein the step of transforming also depends on at least one characteristic of a user profile of a user listening to the synthesized speech.

20. The method of claim 1, wherein at least one characteristic of the user profile is that the user is hearing impaired.

21. The method of claim 19, wherein at least one characteristic of the user profile is that the user is visually impaired.

22. The method of claim 1, wherein the step of transforming also depends on at least one characteristic of a hardware engine a user employs to listen to the synthesized speech.

23. The method of claim 1, wherein the semantics are generated using at least one of an inference machine and a database mapping technique.

24. A computing apparatus for synthesizing speech from input text, the computing apparatus comprising:
  a retriever configured to retrieve the input text entered into the computing apparatus;
  a transformer configured to automatically transform the input text based on the semantics of at least one word of the input text and based on the context of the input text to generate a formatted text, wherein the transformer is configured to automatically add an audio rendering effect to the input text based on the semantics of at least one word, the audio rendering effect comprising background music, special effect sounds, and context sensitive sounds; and
  a modifier configured to modify the formatted text to fit the requirements of a text-to-speech software engine.

25. The apparatus method of claim 24, wherein the semantics are generated by at least one of an inference machine and a database mapping technique.

26. A method of synthesizing speech from input text, the method comprising:
  retrieving the input text entered into a computing system;
  transforming the input text based on the semantics of at least one word of the input text and at least one characteristic of a profile of a user to generate a formatted text, the transforming step being automatic and dependent upon the context of the input text, wherein the step of transforming includes adding an audio rendering effect to the input text based on the semantics of at least one word, the audio rendering effect comprising background music, special effect sounds, and context sensitive sounds; and
  modifying the formatted text to fit the requirements of a text-to-speech software engine.

27. The method of claim 25, wherein the step of transforming also depends on the semantics of at least one word of the input text.

28. A method of synthesizing speech from input text, the method comprising:
  retrieving the input text entered into a computing system;
  transforming automatically the input text based on the semantics of at least one word of the input text and at least one characteristic of a hardware engine to generate a formatted text; and
  modifying the formatted text to fit the requirements of a text-to-speech software engine and the hardware engine.

29. A method of synthesizing speech from input text, the method comprising:
  retrieving the input text entered into a computing system;
  transforming the input text based on the semantics of at least one word of the input text to generate a formatted text for speech synthesis, wherein the transforming step is automatic and depends upon the context of the input text, wherein the semantics are generated using a database mapping technique, wherein the database mapping technique provides additional information relating to said at least one word; and,
  modifying the formatted text to fit the requirements of a text-to-speech software engine.

* * * * *

UNITED STATES PATENT AND TRADEMARK OFFICE
CERTIFICATE OF CORRECTION

PATENT NO.     : 6,446,040 B1
DATED          : September 3, 2002
INVENTOR(S)    : Gudrun Socher et al.

It is certified that error appears in the above-identified patent and that said Letters Patent is hereby corrected as shown below:

Column 9,
Line 18, delete "around" and insert therefor -- ground --

Column 10,
Line 5, delete "method"
Lines 11-12, after "text based on" delete "the semantics of at least one word of the input text and"
Line 23, after "of claim" delete "25" and insert therefor -- 26 --

Signed and Sealed this

Eleventh Day of March, 2003

JAMES E. ROGAN
*Director of the United States Patent and Trademark Office*